United States Patent [19]

Ohashi

[11] Patent Number: 4,992,894
[45] Date of Patent: Feb. 12, 1991

[54] CASSETTE LOADING MECHANISM

[75] Inventor: Keiichi Ohashi, Tochigi, Japan

[73] Assignee: Sharp Kabushiki Kaisha, Osaka, Japan

[21] Appl. No.: 370,335

[22] Filed: Jun. 22, 1989

[30] Foreign Application Priority Data

Jun. 24, 1988 [JP] Japan .................................. 63-157823
Jun. 24, 1988 [JP] Japan .................................. 63-157824

[51] Int. Cl.$^5$ ............................................. G11B 15/60
[52] U.S. Cl. ........................................ 360/94; 360/85
[58] Field of Search ........................... 360/94, 85, 137

[56] References Cited

U.S. PATENT DOCUMENTS 4,558,384 12/1985 Umeda ................................. 360/94
4,590,528 5/1986 Tsuruoka et al. .................... 360/94
4,866,550 9/1989 Ohashi et al. ........................ 360/94

FOREIGN PATENT DOCUMENTS 54-63731 5/1979 Japan .
58-128048 7/1983 Japan .
59-193502 11/1984 Japan .
59-227061 12/1984 Japan .
59-227062 12/1984 Japan .
60-1643 1/1985 Japan .
60-9037 1/1985 Japan .

Primary Examiner—John H. Wolff
Assistant Examiner—Alfonso Garcia

[57] ABSTRACT

A cassette loading mechanism for a magnetic recording/reproducing device is disclosed, in which two different cassettes can be loaded selectively. Two inserting openings, profiled to conform to a large size cassette and a small size cassette, are provided in a cassette control unit. The large size cassette, when introduced, is held by a slider. This slider is movable between a position of insertion and a position of recording and/or reproduction. The small size cassette inserted into the unit is held by an adapter chassis. This adapter chassis is movable by the medium of the loading chassis, between a position of insertion and a position of recording/reproduction. The adapter chassis may be attached to the slider. A lid is mounted to the unit for rotation for opening or closing the inserting opening for the large size cassette. Locking levers for engaging with the lid are provided at both end edge portions of the lid. This locking lever releases the locking of the lid only when the large size cassette is introduced. The lid is opened only when the large size casseete is introduced via the inserting opening for the large size cassette.

2 Claims, 7 Drawing Sheets

LARGE CASSETTE INSERTION DIRECTION

FIG.9

CASSETTE LOADING MECHANISM

CROSS-REFERENCE TO RELATED APPLICATIONS

This application is related to copending U.S. application Ser. No. 171,746/1988, filed Mar. 22, 1988, now U.S. Pat. No. 4,866,550.

BACKGROUND OF THE INVENTION

1. Field of the Invention

This invention relates to a cassette loading mechanism for a recording/reproducing device for loading a cassette enclosing a magnetic tape to a recording position. This invention also is utilized in the cassette loading mechanism in which several types of cassettes having different sizes can be selectively attached in the device for recording and/or reproduction.

2. Description of the Background Art

There are known several types of cassettes of different sizes for enclosing a magnetic tape as the magnetic recording medium. For recording/reproducing cassettes of different sizes, magnetic recording/reproducing devices, such as video tape recorders (VTRs), designed for the different sizes of cassettes, are employed. When recording/reproducing small-size cassettes using VTRs for large size cassettes, a cassette adapter is employed for loading the small-size cassette at the position of recording/reproducing the large-size cassettes.

There are disclosed different techniques utilized in the magnetic recording/reproducing device into which plural kinds of cassettes of different sizes can be loaded. For example, the Japanese Patent Laying Open No. 63731/1979 discloses a cassette type magnetic recording/reproducing device having a common opening for inserting a magnetic head and pinch roll and in which at least two kinds of large and small size tape cassettes can be attached into the same cassette loading section, wherein the recording/reproducing device includes a mechanism for driving a driving source of a small size cassette by the power transmitted from a driving shaft for a large size cassette. The Japanese Patent Laying Open No. 128048/1983 discloses a magnetic recording/reproducing device in which a unit for extracting the tape from the large size cassette and a unit for extracting the tape from the small size cassette may be used at least partially in common with each other. The Japanese Patent Laying Open No. 193502/1984 discloses a cassette loading mechanism in which a cassette adapter is used for the case in which the small size cassette is recorded and/or reproduced using a VTR for a large size cassette. In this cassette loading mechanism, the small size cassette may be introduced or taken out via a small size cassette insertion opening different from the cassette adapter insertion opening, while the cassette adapter is positioned at the cassette adapter insertion opening. The Japanese Patent Laying Open No. 227061/1984 discloses such a cassette loading mechanism which is provided with control means for controlling a cassette adapter so that the cassette adapter operation is discontinued upon insertion of the cassette adapter when it is detected whether the unit that has been introduced or taken out is the cassette adapter or the large size cassette. The Japanese Patent Laying Open No. 227062/1984 discloses an arrangement which is provided not only with the above control means but also with separate control means whereby the cassette adapter is halted at a predetermined position when the small size cassette is not inserted into the cassette adapter, when it is detected whether the cassette adapter and the small size cassette are present or not. The Japanese Patent Laying Open No. 1643/1985 discloses a cassette loading mechanism in which, when the cassette adapter is employed, the tape loading operation and the tape unloading operation may be carried out automatically by an electric motor. The Japanese Utility Model Laying Open No. 9037/1985 discloses a cassette loading mechanism in which a large size cassette and a small size cassette may be selectively loaded using an adapter for small size cassettes, and in which the adapter for the small size cassette may be retained in the device as it is emptied of the small size cassette.

Figure 1:
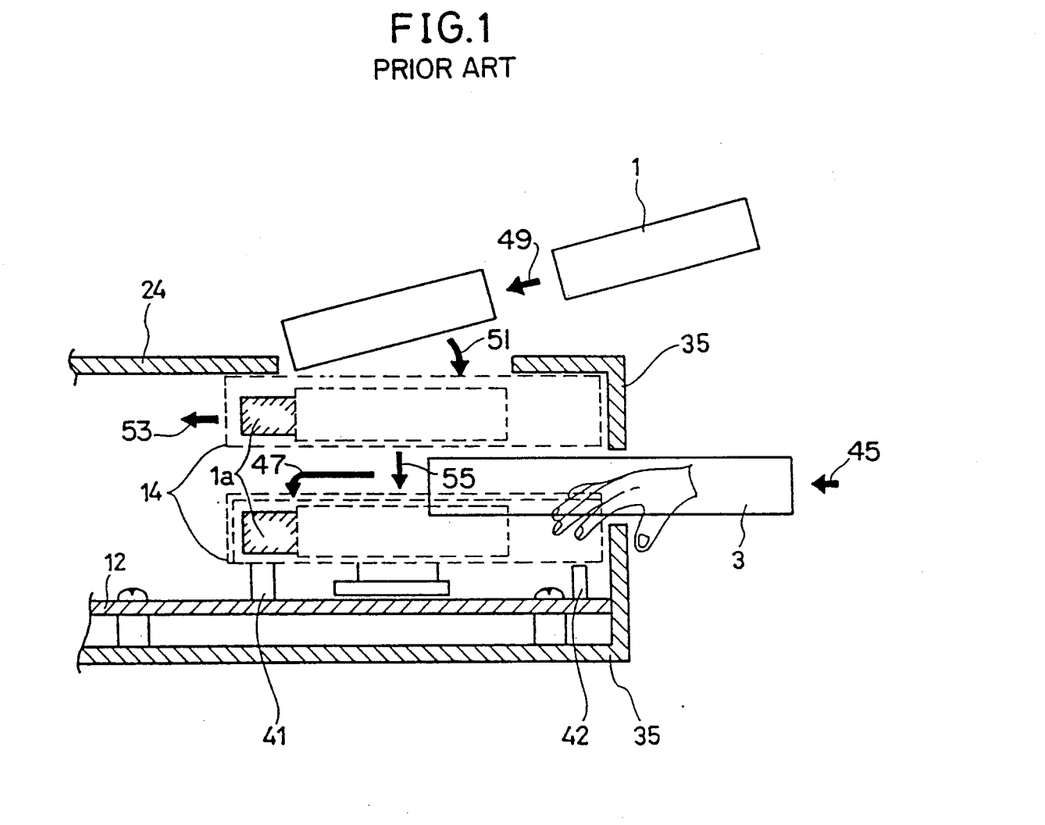
FIG. 1 is a schematic view showing the diagrammatic operation of a cassette control units.

In the Japanese Patent Application No. 198415/1987 filed in Japan on Aug. 7, 1987 and in the corresponding U.S. Pat. application Ser. No. 171746, now U.S. Pat. No. 4,866,550, filed in the United States under claiming the convention rights based on this Japanese Patent Application, the present inventor et al. have invented and disclosed a cassette loading mechanism making it possible to selectively attach a plurality of kinds of cassettes of different sizes for recording and/or reproduction. This cassette loading mechanism is designed for selectively attaching a large size cassette or a small size cassette for recording and/or reproduction without employing the cassette adapter. The cassette control unit provided with such a cassette loading mechanism is shown diagrammatically in FIG. 1. Referring to this figure, when a large size cassette 3 is introduced in a direction shown by the arrow mark 45 from a front cabinet 35, the cassette is loaded into the loading position for recording and/or reproduction, as it is held by a slider in the direction shown by the arrow mark 47. For loading a small size cassette, the cassette is introduced from an upper cabinet 24 in the direction shown by the arrow mark 49, and lowered in the direction shown by the arrow mark 51, so as to be attached in position in within an adapter chassis 14. Then, after a magnetic tape 1a is extracted by an adapter motor, not shown, in the direction shown by the arrow mark 53, the adapter chassis 14 is lowered in the direction shown by the arrow mark 55 for loading the small size cassette 1 in the predetermined recording/reproducing position.

When the adapter chassis 14 having the small size cassette 1 attached thereto is lowered, the adapter chassis 14 may be contacted with the large size cassette or a hand occasionally introduced into the cabinet, thus causing damage to the device.

On the other hand, a slider for holding and securing the large size cassette 3 is positioned in the downward path of travel of the adapter chassis 14. Therefore, when loading the small size cassette 1, it is necessary to shift the slider along the direction shown by the arrow mark 47 while the large size cassette 3 is not introduced into the cabinet. In the course of the movement of the slider, when the large size cassette 3, foreign matter or hand is introduced from the front cabinet 35, there is the risk that various component parts of the mechanism of the magnetic recording/reproducing device may be damaged. This presents a problem in that the operational safety in the cassette loading and removal operation is impaired.

The problem of the impaired operational safety is also presented in a cassette control unit dedicated to large or small size cassettes. That is, the component parts of the mechanism of the magnetic recording and/or reproducing device may be impaired by the foreign matter, hand or finger inserted via the cassette inserting opening after the large size cassette or the small size cassette is introduced via the predetermined cassette inserting opening so as to be loaded to the predetermined magnetic recording/reproducing position. For example, when the small size cassette is inserted by mistake via the large cassette inserting opening, there is the risk that other mechanisms or cassettes in the magnetic recording and/or reproducing device may be damaged.

SUMMARY OF THE INVENTION

It is an object of the present invention to provide a cassette loading mechanism having a mechanism whereby a cassette inserting opening may be opened only when a predetermined cassette is introduced therein.

It is another object of the present invention to provide a cassette loading mechanism provided with a mechanism allowing a cassette inserting opening to open only when a predetermined cassette is introduced therein but not allowing it to open when the cassette has been loaded to the recording/reproducing position.

It is a further object of the present invention to provide a cassette loading mechanism for selectively loading a large size cassette or a small size cassette, wherein there is provided a mechanism allowing a large cassette inserting opening to open only when the large size cassette is introduced into the large size cassette inserting opening.

It is yet another object of the present invention to provide a cassette loading mechanism for loading plural kinds of cassettes of different sizes selectively at the recording/reproducing position, wherein the safety in the cassette loading operation and the reliability in the cassette loading function are improved.

In one aspect of the present invention, the cassette loading mechanism includes a casing, a lid, a first engaging portion, a second engaging portion, a first urging portion and a second urging portion. The casing is provided with an inserting opening profiled to receive the cassette to be introduced therein. The lid is movably attached to the casing for opening or closing the inserting opening. The first engaging portion can be engaged with the lid and is mounted to one of mutually confronting edge portions of the lid for movement between a position engaging the with the lid and a position not engaging with the lid. The second engaging portion can be engaged with the lid and is provided to the other of the mutually confronting edge portions for movement between the position engaging with the lid and the position not engaging with the lid. This second engaging portion is operated independently of the first engaging portion. The first urging portion urges the first engaging portion for holding the first engaging portion at the position engaging with the lid. The second urging portion urges the second engaging portion for holding the second engaging portion at the position engaging with the lid. The first engaging portion includes an abutting portion abutting on the cassette introduced via the inserting opening and shifting the first engaging portion to its non-engaging position responsive to the cassette inserting operation. The second engaging portion has an abutting portion abutting on the cassette introduced via the inserting opening and shifting the second engaging portion to its non-engaging position responsive to the cassette inserting operation.

According to a preferred embodiment of the present invention, the lid is rotatably attached to the casing. An arm is preferably mounted to the casing so that the arm may be rotated in operative association with the rotation of the lid. For holding the arm to the position in which the lid closes the inserting opening, it suffices to provide an arm urging portion for urging the arm. It suffices that the lid has a an abutment portion abutting on the cassette introduced via the inserting opening and turning the lid to the position of opening the inserting opening responsive to the cassette inserting operation. The arm may be provided with an abutment portion for abutting with the cassette introduced or taken out via the inserting opening and turning the arm responsive to the cassette inserting or taking-out operation.

In one aspect of the present invention, the cassette loading mechanism is so designed that the first and second engaging portions are moved to a position out of engagement with the lid only when a predetermined type of cassette is introduced via the cassette inserting opening. The first and second engaging portions are provided at the mutually confronting edge portions of the lid and are separately operable. Therefore, the lid cannot be opened even when a cassette other than the predetermined type of cassette is introduced via the inserting opening so that one of the first and second engaging portions is shifted to a position out of engagement with the lid. Therefore, the lid is opened only when the predetermined type of cassette is introduced via the inserting opening but is not opened otherwise. As a result, it is possible to prevent the occurrence of the situation in which the foreign matter, hand or finger is inserted into the cassette inserting opening or a cassette of a different size is introduced by mistake into the cassette inserting opening. This results in an improved cassette loading operation.

In another aspect of the present invention, the cassette loading mechanism is so designed that plural kinds of cassettes of different sizes can be loaded selectively into the recording/reproducing position. This cassette loading mechanism includes a casing, a holding section for a large size cassette, a shifting section for a large size cassette, a holding section for a small size cassette, a shifting section for a small size cassette, a lid, a first engaging portion, a second engaging portion, a first urging portion and a second urging portion. The casing is provided with an inserting opening for a large size cassette profiled to receive the large size cassette, and an inserting opening for a small size cassette profiled to receive the small size cassette. The holding section for the large size cassette holds the large size cassette introduced into the casing via the inserting opening for the large size cassette at the predetermined position. The shifting section for the large size cassette shifts the holding section for the large size cassette between the inserting position for the large size cassette and the position of recording and/or reproduction. The holding section for the small size cassette holds the small size cassette introduced into the casing via the inserting opening for the small size cassette at the predetermined position. The shifting section for the small size cassette shifts the holding section for the small size cassette between the inserting position for the small size cassette and the position for recording and/or reproduction. The holding section for the small size cassette can be attached to the holding section for the large size cassette that has been shifted to the recording/reproducing position. The lid is movably attached to the casing for opening the inserting opening for the large size cassette. The first engaging portion can be engaged with the lid and is provided to one of mutually confronting edge portions of the lid for movement between the position of engaging with the lid and the position out of engagement with the lid. The second engaging portion can be engaged with lid and is provided to the other of the mutually confronting edge portions of the lid for movement between the position of engaging with the lid and the position out of engagement with the lid. The second engaging portion operates separately from the first engaging portion The first urging portion urges the first engaging portion for holding the first engaging portion at the position of engaging with the lid. The second urging portion urges the second engaging portion for holding the second engaging portion at the position of engaging with the lid. The first engaging portion has the first abutment portion abutting with the cassette introduced via the large size cassette inserting opening and adapted for shifting the first engaging portion to its non-engaging portion responsive to the inserting operation of the cassette. The second engaging portion has a second abutment portion abutting on the cassette introduced via the large cassette inserting opening and adapted for shifting the second engaging portion to its non-engaging position responsive to the inserting operation of the cassette. Both the first and second abutment portions can abut against the large size cassette introduced via the large cassette inserting opening. One of the first and second abutment portions can abut against the small size cassette introduced via the large size cassette inserting opening.

According to a preferred embodiment of the above described cassette loading mechanism, means for sensing the opening and/or closure of the lid is provided at the large size cassette inserting opening for sensing the opened and/or closed state of the lid.

In a still another aspect of the present invention, the cassette loading mechanism is so designed that the first and second abutment portions abut against the large size cassette only when the large size cassette is introduced via the large cassette inserting opening. On the other hand, when a small size cassette, foreign matter, hand or finger is introduced via the large size cassette inserting opening, one of the first and second abutment portions can abut against the inserted object. Thus, the first and the second engaging portions provided respectively with the first and the second abutment portions are actuated separately, so that the lid can be opened only when the large size cassette is introduced via the large size cassette inserting opening. When a small size cassette or foreign matter is introduced via the large size cassette inserting opening, the lid cannot be opened even when one of the engaging portions has been able to shift the lid to its non-engaging position. Therefore, the lid provided with the large size cassette inserting opening can be opened only when the large size cassette is introduced, but cannot be opened when any other object is introduced. When an object other than the large size cassette is introduced, the lid is kept in the closed state. As a result, the operational safety of the cassette loading operation may be improved in the cassette loading mechanism in which the large size cassette and the small size cassette can be loaded selectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
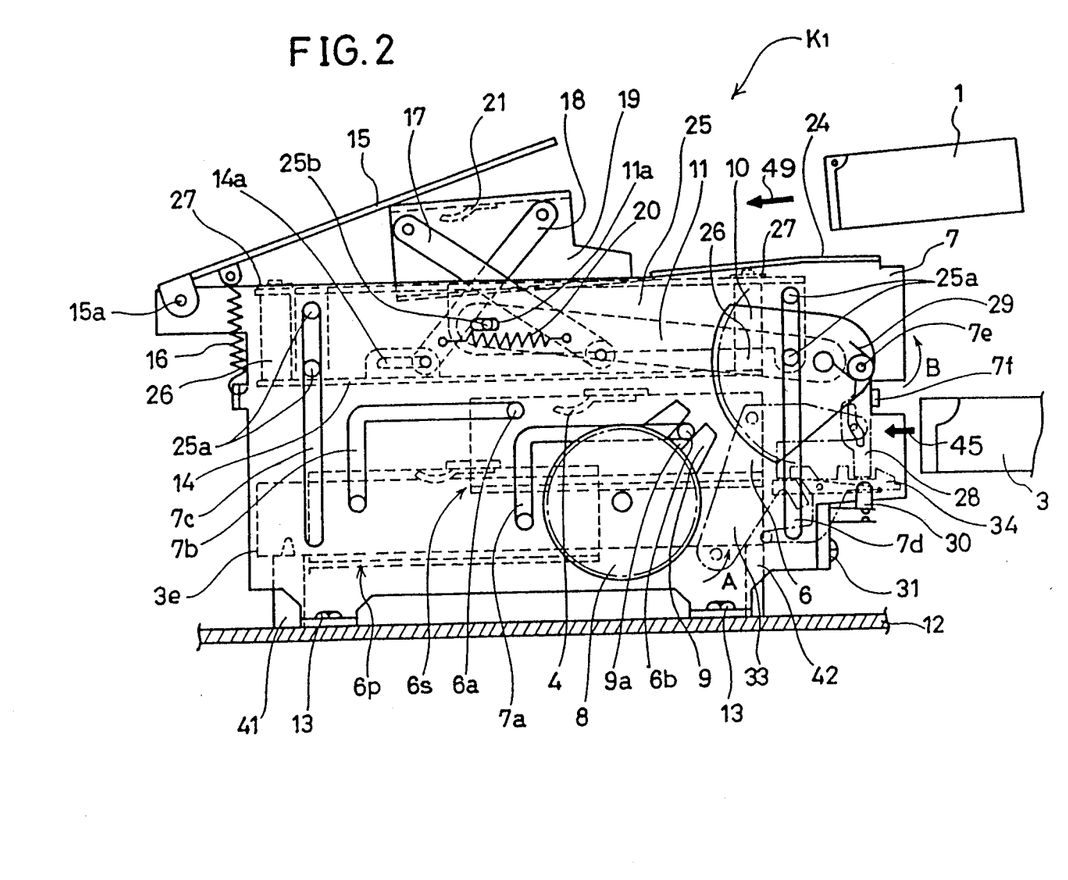
FIGS. 2 and 3 are left-hand side views showing the cassette control unit of the magnetic recording/reproducing device according to the present invention.
Figure 3:
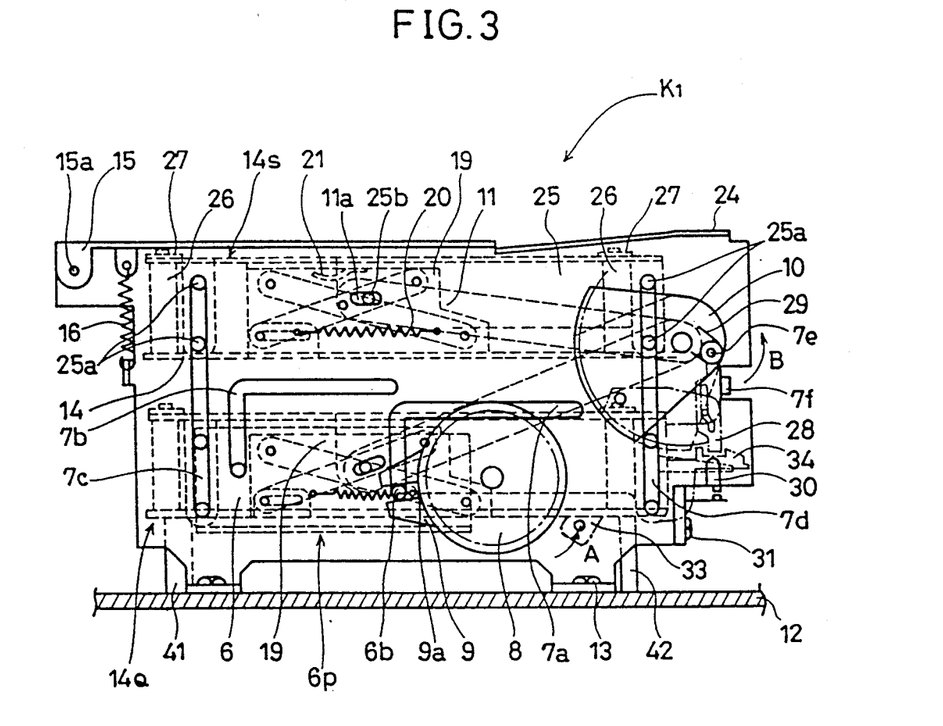
Figure 6:
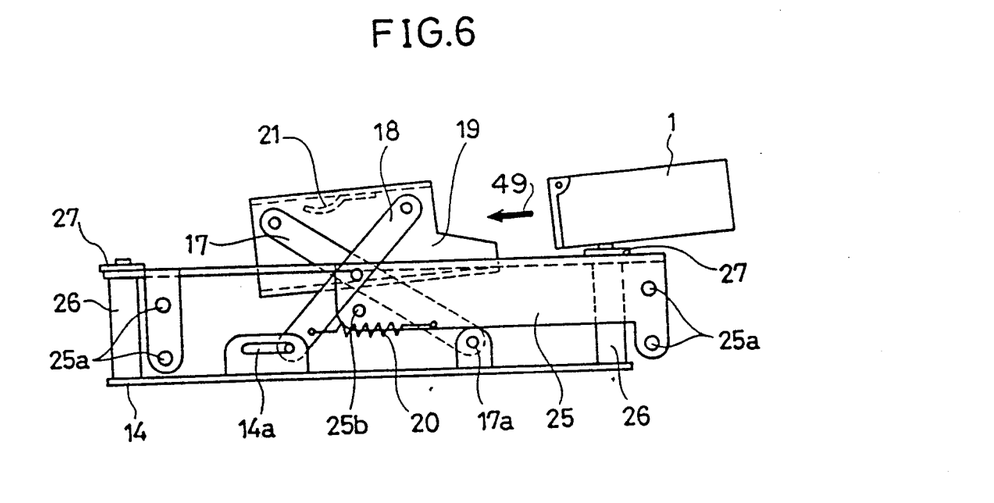
FIG. 6 is a left-hand side view showing an adapter chassis employed for introducing a small size cassette.
Figure 7:
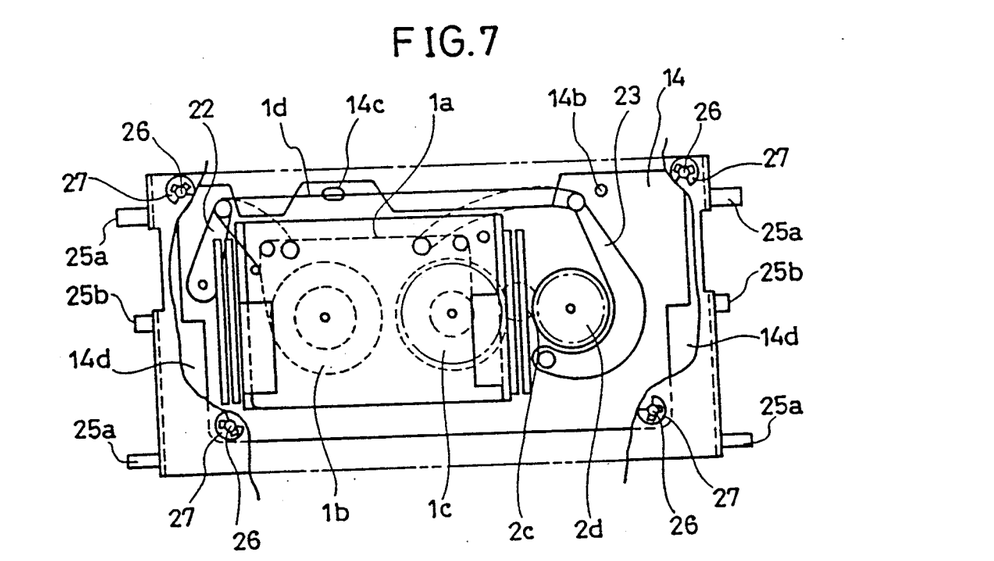
FIG. 7 is a plan view showing an adapter chassis.

FIGS. 2 to 10 illustrate an embodiment of a magnetic recording/reproducing device according to the present invention. FIGS. 2 and 3 are left-hand side views of a cassette control unit K1. It is noted that the right-hand side view of the cassette control unit K1 is the same as the left-hand side view as long as the mechanism thereof is concerned. FIGS. 6 and 7 are a left-hand side view and a plan showing an adapter chassis used for inserting the small size cassette, respectively.

Referring to FIGS. 2 and 3, a guide plate 7 is provided with L-shaped grooves 7a and 7b and two straight grooves 7c and 7d. The guide plate 7 is secured to a main chassis 12 by two set screws 13. A driving gear 8 is rotatably mounted to the guide plate 7. A driving arm 9 is secured to the driving gear 8. Thus, the driving gear 8 and the driving arm 9 may be rotated on the same axis. A loading gear 10 is rotatably mounted to the guide plate 7. A loading arm 11 is secured to the loading gear 10. Thus, the loading gear 10 and the loading arm 11 may be rotated on the same axis. A slider 6 is provided with a first guide shaft 6a and a second guide shaft 6b. The first guide shaft 6a and the second guide shaft 6b are introduced into the L-shaped grooves 7a and 7b of the guide plate 7. The second guide shaft 6b is inserted into a U shaped groove 9a of the driving arm 9.

Referring to FIGS. 6 and 7, four adapter shafts 26 are secured by riveting to an adapter chassis 14. These adapter shafts 26 are introduced via openings formed in the loading chassis and are secured in position by E-rings 27. Each four loading guide shafts 25 are provided to both sides of the loading chassis 25. Two of each of these loading guide shafts 25a are introduced into the straight grooves 7c and 7d of the guide plate 7. A loading shaft 25b is provided to the loading chassis 25. This loading shaft 25b is introduced into an oblong hole 11a of the loading arm 11. A lid 15 for a small size cassette is attached to the guide plate 7 for rotation about a supporting shaft 15a. This lid for the small size cassette 15 is urged by a return spring in the closing direction.

A first housing arm 17 is mounted to the adapter chassis for rotation about a shaft 17a as fulcrum. A second housing arm 18 has its one end slidably attached in an oblong opening 14a of the adapter chassis 14. The first housing arm 17 and the second housing arm 18 are rotatably engaged with each other in the vicinity of the mid portions thereof as shown. The first housing arm 17 and the second housing arm 18 are mounted for rotation to a housing 19. A lifting spring 20 is engaged with the first housing arm 17 and the second housing arm 18 for uplifting the housing 19. The adapted chassis 14 is provided with positioning holes 14b and 14c at the positions corresponding to those of the large size cassette 3.

Although not shown in FIGS. 2 and 3, a phase gear is provided to each of the left-side and right-side driving gears 8 for causing these driving gears to rotate in phase with each other. The left-side and right-side loading gears 10 are also each provided with a phase gear for causing these gears to rotate in phase with each other.

Figure 4:
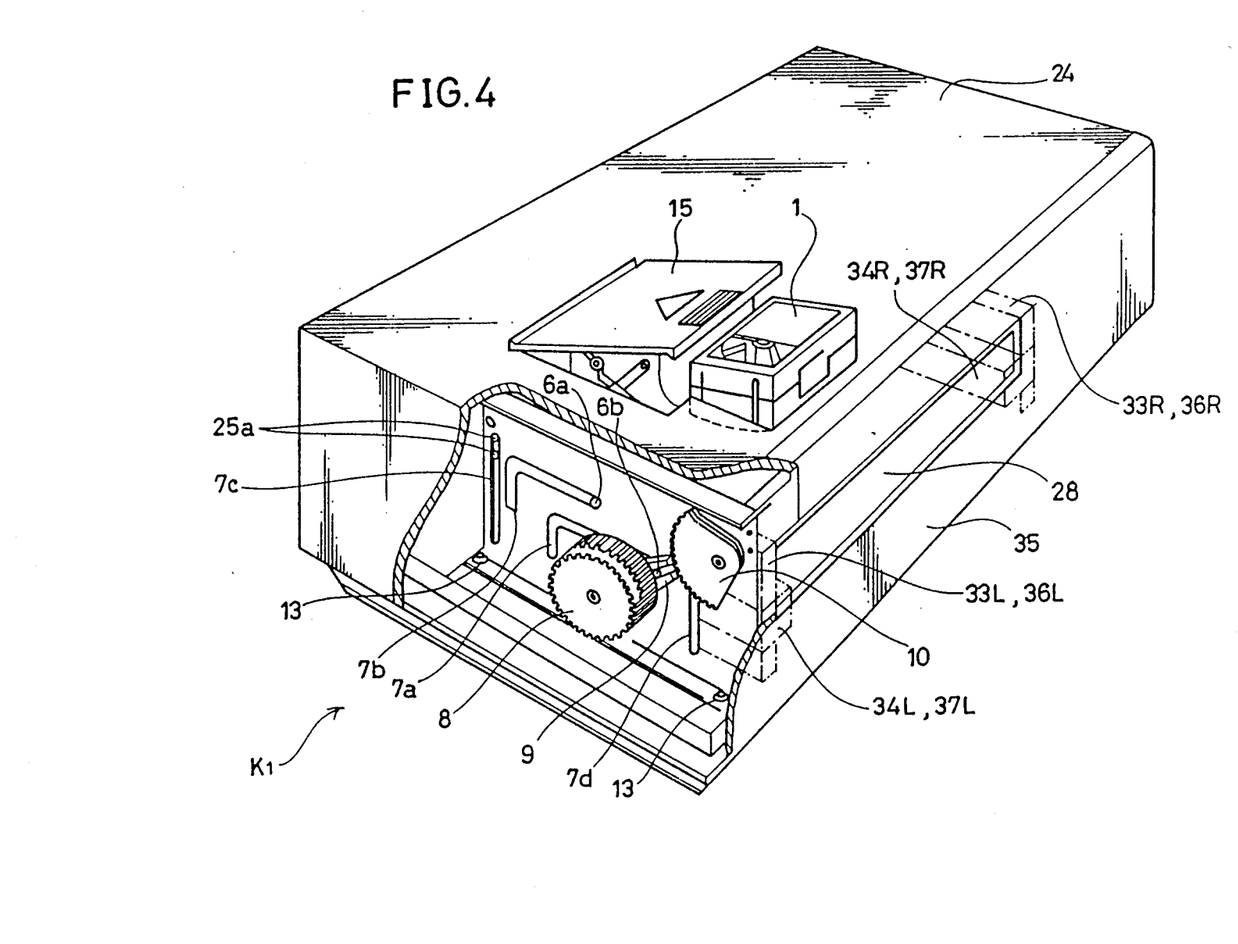
FIG. 4 is a perspective view showing a magnetic recording/reproducing device according to the present invention.
Figure 5A:
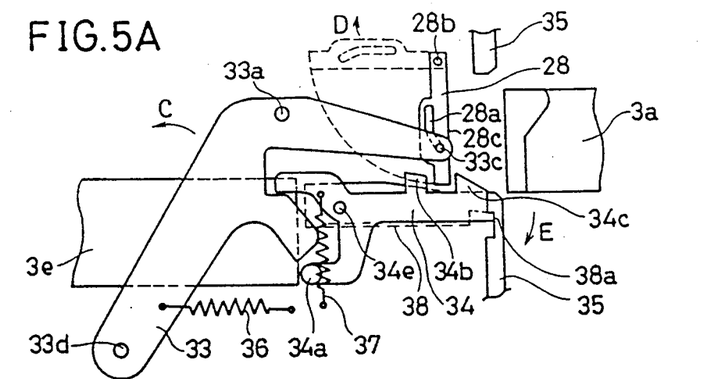
FIGS. 5A, 5B and 5C are schematic side views for illustrating the opening and/or closing mechanism for a lid for a large size cassette provided on the cassette control unit according to the present invention.
Figure 5B:
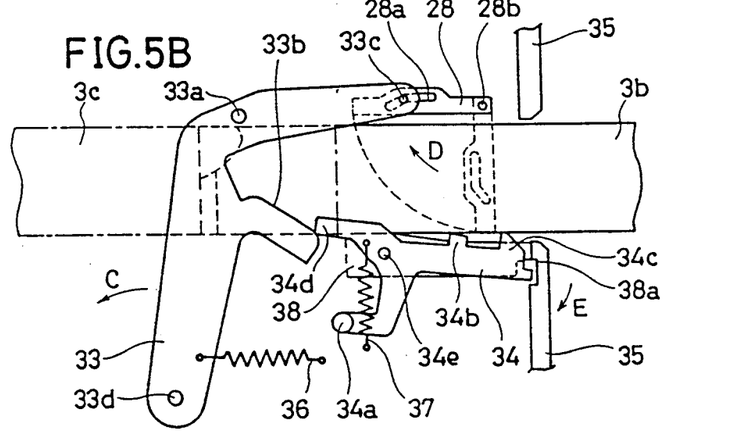
Figure 5C:
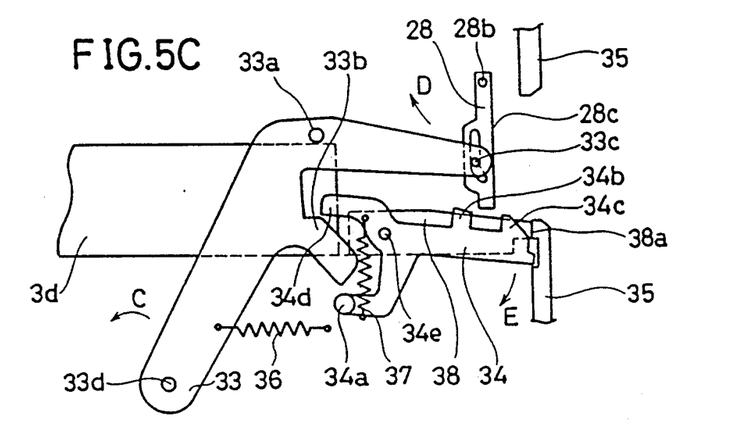

FIG. 4 is a perspective view diagrammatically showing a magnetic recording/reproducing device according to the present invention. FIGS. 5A to 5C are diagrammatic views for a illustrating the operation of the lid for large size cassette 28 provided to a large size cassette inserting opening of the cassette control unit K1.

Referring to FIG. 4, a lid for a large size cassette 28 is provided on a large size cassette inserting opening in a front cabinet 35. Locking levers 34L, 34R are provided on both end edges of the lid 28 for locking the lid 28. Lock lever springs 37L, 37R for urging the levers 34L, 34R for holding these locking levers in the position of locking the lid 28 are provided to the lock levers 34L and 34R, respectively. Opening levers 33L, 33R are provided for rotation in operative association with the opening and closing of the lid 28. These opening levers 33L, 34R are provided with opening lever spring 36L, 36R for urging the opening levers for holding the opening levers at the position in which the lid 28 closes the large size cassette inserting opening. It is noted that, in FIG. 4, the opening levers 33L, 33R, locking levers 34L, 34R opening levers spring 36L, 36R and the locking lever springs 37L, 37R are shown diagrammatically for illustrating only the relative position thereof with respect to the lid 28 in the control unit K1.

Referring to FIGS. 2, 3, and 5A to 5C, the opening and closing mechanism and the locking mechanism for the lid 28 for the large size cassette will be explained. As shown in FIGS. 5A to 5C, the opening and closing mechanism and the locking mechanism for the lid 28 will be explained with respect only to the left-side mechanism of the lid for the large size cassette 28. It will be noted that left-side and right-side opening levers 33L, 33R are shown in FIG. 4, whereas only one opening lever is shown in FIGS. 5A to 5C and indicated by the reference numeral 33. The opening lever 33 is rotatably mounted to the guide plate 7, and the lid 28 is mounted to the guide plate 7 for rotation about the supporting shaft 28b. The supporting shaft 28b is inserted into an opening 7e of the guide plate 7. The lid 28 is urged by a lid spring 29 into abutment with a stopper 7f of the guide plate 7. The opening lever 33 is engaged at 33c in a groove 28a of the lid 28. Thus, as the lid 28 is turned, the portion 33c slides in the groove 28a to cause the opening lever 33 to be turned about a supporting shaft 33d. The opening lever 33 is provided with a pin 33a for extending inwardly from the mutually confronting opening levers 33L, 33R so as not to interfere with other operating portions. This pin 33a is able to contact with one of left-side and right-side upper surface portions of the large size cassette 3 introduced into the device. The opening lever 33 is urged by an opening lever spring 36 in the clockwise direction. A locking lever 34 is mounted on to a guide member 38 adapted for guiding the large size cassette 3 being introduced in the device for rotation about a supporting shaft 34e. The locking lever 34 is urged by a locking lever spring 37 into abutment with the upper portion 38a of the guide member 38. The lid 28 is urged into abutment on the stopper 7f of the guide plate 7 since the opening lever 33 is urged in the clockwise direction by the opening lever spring 36.

Referring to FIG. 5A, when the large size cassette 3 is introduced from a position shown at 3a for loading, the locking lever 34 is pressed down at 34c by the lower surface of the large size cassette 3. As a result, the locking lever 34 is turned in the direction by the arrow mark E and brought to a position shown in FIG. 5B. At this time, the lid 28 does not abut against the locking lever 34 at 34b, so that locking of the lid 28 is released. As the large size cassette 3a is introduced, it abuts against the cassette abutment surface 28c of the lid 28, so that the lid 28 is turned and opened in the direction shown by the arrow mark D.

The locking levers 34L, 34R are provided, one each at the both side edges of lid 28, for abutting against the end edges of the large size cassette 3 as it is introduced into the device. Thus, locking of the lid 28 can not be released unless the left-side and right-side locking levers 34L, 34R are pressed down simultaneously. Therefore, locking of the lid 28 can not be released by intrusion of the hand or finger.

As the large size cassette 3 is introduced into the position shown at 3b in FIG. 5B, the lid 28 is opened, the pin 33a of the opening lever 33 abutting on the upper surface of the large size cassette 3. This causes the opening lever 33 to be turned in the direction shown by the arrow mark C. At this time, a loading motor, not shown, is driven as described later so that the large size cassette is moved from the position 3b to the position 3c (FIG. 5B) through a position 3d (FIG. 5C) and then to the position 3e shown in FIG. 5A. This terminates the loading of the large size cassette. The opening levers 33 are returned to the original position and the lid 28 continues to be locked by the locking lever 34. When the loading of the large size cassette 3 is terminated and the large size cassette 3 is moved to the position shown at 3e, the pin 34a of the locking lever 34 is brought into contact with the end surface of the large size cassette 3. Hence, the locking lever 34 cannot be turned in the direction shown by the arrow mark E. Thus, locking of the lid 28 can not be released in the loaded state of the large size cassette 3. Consequently, the lid 28 is rocked by the large size cassette 3 itself during recording and/or reproduction of the large size cassette 3 to provide for redoubling the function of preventing the intrusion of the foreign matter via the large size cassette inserting opening.

For ejecting the large size cassette 3, the loading motor is reversed in its operation, so that the large size cassette 3 is moved from the position shown at 3e to the position shown at 3d. At this time, the large size cassette 3 thrusts the pin 33a of the opening lever 33, so that the opening lever 33 is turned in the direction shown by the arrow mark C. At this time, the opening lever thrusts at 33b the locking lever 34 at 34d, so that the locking lever 34 is turned in the direction shown by the arrow mark E. This releases locking of the lid 28. During this time, the lid 28 may not be opened. As the large size cassette 3 is raised further to a position shown at 3c, the opening lever 33 is turned further in the direction shown by the arrow mark C. Thus, the lid 28 may be opened with the turning movement of the opening lever 33. The large size cassette 3 is moved from the position shown at the 3b to the position shown at 3a so as to be taken out from the device. It is noted that the opening lever 33 and the locking lever 34 are contacted flat with the large size cassette 3 only at portions 34a, 33a 34b, 34c while the remaining portion of the opening lever 33 and the locking lever 34 are adapted to clear the large size cassette.

Referring to FIGS. 2 and 3, the large size cassette inserting opening is provided with a lid switch 30. This lid switch is attached to the guide plate 7 by a set screw 31. The lid switch 30 is included in an electrical circuit which is closed when the lid 28 is closed and which is opened when the lid is opened even slightly.

The comprehensive operation of loading and removal of the large size cassette 3 and the small size cassette 1 is hereinafter explained.

Referring to FIG. 2, for loading the large size cassette 3, it is inserted into the slider by manual operation in the direction shown by the arrow mark 45. This causes the large size cassette 3 to be pressured and secured to the slider 6 by a spring 4 for the large size cassette which is attached to the slider 6. At this time, the slider 6 is at the position shown at 6S in FIG. 2B. If a loading start switch, not shown, senses that the large size cassette has been introduced to a predetermined position, the driving motor, not shown, is driven for turning the driving gear 8 and the driving arm 9 in the direction shown by the arrow mark A. The second guide shaft 6b is driven by this turning movement of the gear 8 and the arm 9. The slider 6 is moved horizontally as it is guided along the two L-shaped grooves 7a and 7b in the guide plate 7. The slider 6 then is moved vertically downward to a position shown at 6P in FIG. 2. The large size cassette 3 is positioned to complete the loading of the large size cassette. The positioning of this large cassette 3 will be explained later.

For ejecting the large size cassette, the driving motor is reversed in operation and the operation which is the reverse of the above described operation is performed to take out the large size cassette 3.

Referring to FIGS. 2 and 3, for loading the small size cassette 1, the cassette 1 is inserted into the housing 19 by the manual operation in the direction shown by the arrow mark 49. This causes the small size cassette 1 to be pressured and secured to the housing 19 with the aid of a spring 21 for the small size cassette which is secured to the housing 19. At this time, the housing 19 is at the position shown in FIG. 2. The housing 19 is then pressed down to shift the housing 19 to the position shown in FIG. 3. The housing 19 is now attached and locked to the adapter chassis 12 by a locking mechanism, not shown, attached to the adapter chassis 14. At this time, the adapter 14 is at the position shown at 14S in FIG. 2. A locking sensor switch and a small size cassette sensor switch, both not shown, sense that the small size cassette 1 is introduced and the housing 19 is locked in position. By this sensing, a housing motor, not shown, operates to drive a first tape extraction arm 22 and a second tape extraction arm 23. An end roll is mounted for rolling at each of the first tape extraction arm 22 and the second tape extraction arm 23. The first tape extraction arm 22 and the second tape extraction arm 23 are attached for rotation to the adapter chassis 14. The magnetic tape 1a is extracted to a predetermined position 1d, as shown in FIG. 7, under the driving by this first plate extraction arm 22 and the second tape extraction arm 23.

At this time, the state of the lid switch 30 is sensed. When the electrical circuit of the lid switch is closed, it is determined with respect to the state of the large cassette inserting opening that the large size cassette or the hand has not been introduced into this inserting opening. Simultaneously, the driving motor is driven into operation. The slider 6 is shifted to the position shown at 6P in FIG. E, that is, to the position for recording and/or reproduction, in the same way as when the large size cassette 3 is loaded. When the electrical circuit of the lid switch 30 is closed, it is determined with respect to the state of the large cassette inserting opening that the large size cassette or the hand has been inserted into this inserting opening. At this time, this state is indicated in a VTR display section, not shown. This indication on the VTR display section indicates to the user of the cassette control unit to take out the large size cassette 3 or the hand from the inserting opening. At this time, the state of the lid switch 30 is repeatedly sensed. When the electrical circuit of the lid switch 30 is closed, the slider 6 is shifted, in the same way as described hereinabove. The operation of the slider 6 is terminated upon closing of the circuit of the lid switch 30.

Figure 8:
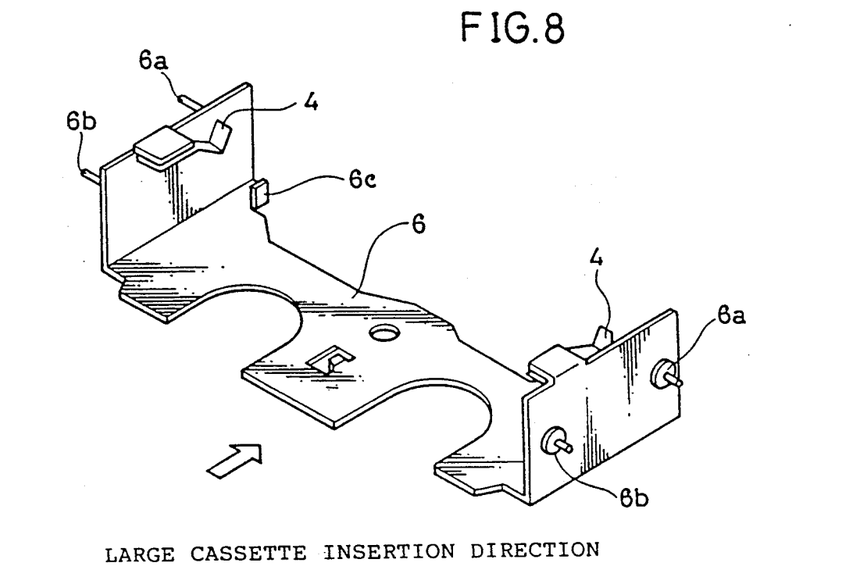
FIG. 8 is a perspective view showing a slider for introducing a large size cassette.

When it is sensed that the magnetic tape 1a has been extracted to the predetermined position 1d and the slider 6 has been shifted to the position 6P for recording and/or reproduction, the loading motor, not shown, is driven into operation. The loading gear 10 and the loading arm 11 are turned in the direction shown by the arrow mark B. The loading chassis 25 is lowered as it is maintained in the horizontal state and guided into straight grooves 7c and 7d in the guide plate 7. The adapter chassis 14 is attached to the loading chassis 25, so that it is lowered together with the loading chassis 25. At this time, the adapter chassis 14 is guided and moved into registration with two positioning pins 41. The position and the height level of the adapter chassis 14 is determined because the adapter chassis 14 is loaded on the foremost parts of the two positioning pins 42 and the flattened end portions of the two positioning pins 41. The position and the height level of the adapter chassis are those shown at 14Q in FIG. 3. In this manner, the adapter chassis 14 is positioned by the two positioning pins 41 and two positioning pins 42, as when the large size cassette 3 is loaded, so as to be pressured and secured by the pressuring spring, not shown, provided to the loading chassis 25. The slider 6 is not provided with a ceiling plate, as shown in FIG. 8. The adapter chassis 14 is provided with a clearance 14d to avoid collision with the spring for the large size cassette 4, as shown in FIG. 7.

In this manner, the small size cassette 1 is attached. During this operation, the state of the lid switch 30 is sensed and, when it is in the closed state, the operation is continued. However, when the lid switch 30 is in the open state, the operation of the loading motor is discontinued to terminate the lowering of the adapter chassis 14.

As described hereinabove, the state of the lid switch 30 is sensed at the time of loading the small size cassette 1 to provide for improved safety in the cassette loading operation. The lid 28 is locked against opening by the locking lever 34 unless the large size cassette 3 is introduced. The adapter chassis 14 is provided with a portion abutting against the locking lever 34 at 34a, similar to the large size cassette 3 located at the position 3e shown in FIG. 5A. For this reason, the lid 28 continues to be locked even when the adapter chassis 14 is positioned at the recording/reproducing position. This locking of the lid 28 provides for duplex prevention of the occurrence of mistaken operation at the large size cassette inserting opening, so that the operational safety in the loading of small size cassettes is improved.

Referring to FIG. 7, the small size cassette 1 is provided with a supply reel 1b and a take-up reel 1c. The magnetic tape 1 is placed about the supply reel 1b and the take-up reel 1c. A gear is cut on the half portion of the take up reel 1c. The take-up reel 1c meshes with the drive gear 2c mounted for rotation to the adapter chassis 14. The driving gear 2c meshes with the driving reel 2d. For taking-up or unreeling the magnetic tape 1a, the driving reel 2d and the supply reel 1b are driven into operation by a reel motor, not shown.

For ejecting the small size cassette 1, the loading chassis 25 and the adapter chassis 14 are raised by the loading motor by the operation which is the reverse of that for loading. During this time, the state of the lid switch 30 is sensed, in the same way as when the adapter chassis 14 is lowered. When the lid switch 30 is in the open state, the operation of the loading motor is terminated. When it is sensed that the adapter chassis is raised, the operation of the driving motor is reversed. The slider is moved to its original position by the operation similar to that for ejecting the large size cassette 3. Simultaneously, the first tape extraction arm 22 and the second tape extraction are 23 are driven in the direction which is reverse of that described hereinabove. That magnetic tape 1a is returned to its original position. The locking of the housing 19 is released. The housing 19 is raised by the operation of an uplifting spring 20. The lid for the small size cassette 15 is opened to allow for taking out of the small size cassette 1.

It will be noted that, when the small size cassette is not introduced into the housing 19, the switch for detecting the insertion of the small size cassette 1 is not activated, even when the housing 19 is pressed down for attachment and locking to the adapter chassis 14. Thus, the first and second tape extraction arms 22, 23 are not driven into operation and, hence, the adapter chassis 14 is not lowered. Consequently, when the small size cassette 1 is not in use, the lid for the small size cassette 19 may be closed by lowering the housing 19 for attaching and locking the housing 19 to the adapter chassis 14. The adapter chassis 14 is not lowered at this time, so that it does not interfere with the insertion of the large size cassette 3.

In addition, the small size cassette 1, hand, finger or other foreign matter may not be introduced via the large size cassette opening during loading or ejection of the small size cassette 1. However, the large size cassette can be introduced via the large size cassette inserting opening. With the small size cassette 1 in the loaded state, the lid 28 cannot be opened unless the large size cassette is erroneously introduced. It is therefore possible to provide a detection device whereby the state of opening of the lid 28 is determined to be an unusual occurrence based upon which the operation is terminated. This prevents destruction of the cassette or other mechanisms of the magnetic recording and/or reproducing device. Although not shown, a lever or the like for preventing insertion of the large size cassette in association with the operation of the slider 6 may be provided for preventing the large size cassette 3 from being introduced in the loaded state of the small size cassette 1.

The two positioning pins 41 and two positioning pins 42 are provided to the main chassis 12 for positioning the adapter chassis during loading of the small size cassette 1. However, since the adapter chassis 14 is attached to the loading chassis 25, the position of the adapter chassis 14 is influenced by the positioning precision of the loading chassis 25. In this manner, the loading position of the small size cassette 1 is determined by the position of the adapter chassis 14 which is determined by the medium of the loading chassis 25.

The aforementioned two positioning pins 41 and two positioning pins 42 used for positioning the adapter chassis 14 are intrinsically employed for precision positioning of the large size cassette. The positioning of the large size cassette is hereinafter explained in detail.

Figure 9:
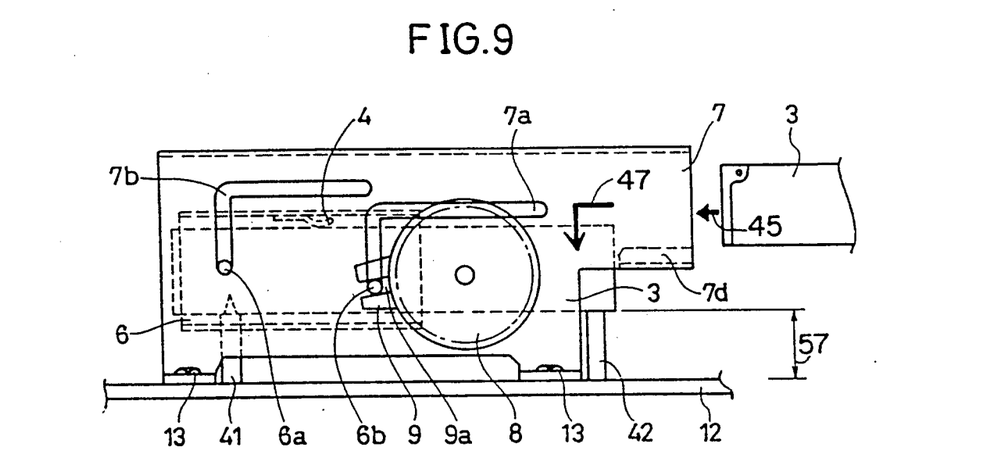
FIG. 9 is a side view showing only the large size cassette inserting portion in the cassette control unit.

FIGS. 8 and 9 are a perspective view and a side-elevational view showing only the large size cassette inserting portion in the cassette control unit of the magnetic recording and/or reproducing device. Referring to FIGS. 8 and 9, when the large size cassette 3 is inserted in the direction shown by the arrow mark 45, the both sides and the lower surface of the large size cassette are surrounded by the slider 6. The forward surface of the large size cassette 3 is regulated by the stopper 6c. The large size cassette 3 is pressured and secured to the lower portion of the slider 6 by two springs 4 for the large size cassette 3. The slider has a width slightly larger than the size of the large size cassette 3. Therefore, when the large size cassette 3 is secured to the slider only by the pressuring of the spring 4 for the large size cassette, the large size cassette 3 is movable to some extent in the interior of the slider 6.

After the large size cassette 3 is pressured and secured to the slider 6, the drive gear 8 is driven into rotation to turn the driving arm 9. The second guide shaft 6b of the slider 6 is guided and moved within the groove 7a of the guide plate 7, as the guide shaft 6b is intruded into the groove 9a of the driving arm 9. Simultaneously, the first guide shaft 6a of the slider 6 is also guided within the groove 7b of the guide plate 7. This causes the slider 6 to be loaded in the direction by the arrow mark 47. With the slider 6 thus loaded, the large size cassette 3, pressured and secured to the slider by the spring 4 for the large size cassette, may also be loaded in a similar manner. At this time, the loading position of the large size cassette 3 is determined by the two positioning pins 41. That is, the loading position of the large size cassette 3 is determined in that the two positioning pins 41 are introduced into openings provided in the lower surface of the large size cassette 3. The loading height position of the large size cassette is determined by the flat portions of the two positioning pins 42 and the two positioning pins 41, as shown at 57 in FIG. 7.

The adapter chassis 14 is provided with openings 14b, 14c at the positions corresponding to those of the large size cassette 3, for receiving the positioning pin 41. By having the bottom surface of the adapter chassis contoured similar to the bottom surface of the large size cassette 3, the positioning of the adapter chassis 14 is achieved by the positioning pins 41. However, the adapter chassis is secured to the loading chassis 25. The loading chassis is moved along the guide groove provided in the guide plate 7. Therefore, the positioning precision of the adapter chassis 14 is influenced by that of the loading chassis 25. As a result, it may occur that, when the adapter chassis 14 with the small size cassette 1 attached thereto is moved to the loading complete position by the medium of the loading chassis 25, the position of the adapter chassis 14 is not registered with that of the positioning pin 41 so that the positioning is not achieved.

Figure 10:
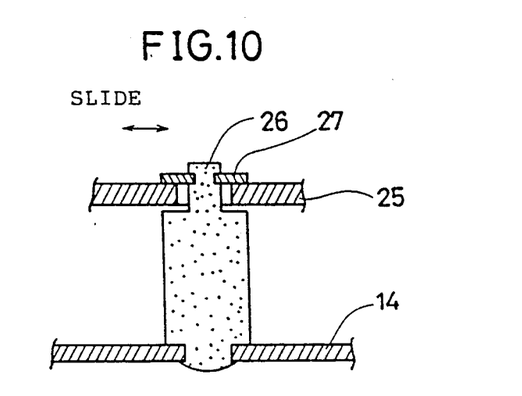
FIG. 10 is a sectional view showing a portion for securing the adapter chassis to the loading chassis.

For overcoming this problem, an arrangement is made so that positioning of the adapter chassis 14 may be achieved accurately even when the loading chassis 25 is moved with more or less positioning deviation. FIG. 10 is a sectional view showing the portion of the adapter chassis 14 secured to the loading chassis 25. As shown in FIG. 10, the end section of the adapter shaft 26 is tapered. The tapered portion of the adapter shaft 26 is formed with a groove for receiving an E-ring 27. The adapter shaft 26 is inserted into the opening provided in the loading chassis 25. The adapter shaft 26 and the loading chassis 25 arc secured by this E-ring 27. The distance between the portion of the adapter shaft 26 receiving the E-ring 27 and the portion thereof having a larger diameter is selected to be slightly larger than the plate thickness of the loading chassis 15. The diameter of the opening in the loading chassis 25 is also selected to be larger than the small diameter of the adapter shaft 26. Thus, the adapter chassis 14 is mounted so as to be movable with respect to the loading chassis 25 by an amount corresponding to the difference in the opening diameters. Consequently, even when the loading chassis 25 is moved with a more or less deviation during movement of the adapter chassis 14 to the recording and/or reproducing position by the medium of the loading chassis 25, the adapter chassis 14 is moved slightly with respect to the loading chassis 25, the two position pins 41 intruding into the positioning openings 14b, 14c. In this manner, precise positioning of the adapter chassis 14 may be achieved during loading of the small size cassette.

It will be appreciated from the foregoing that the present invention provides a cassette loading mechanism provided with a mechanism whereby locking of the lid is released only when a predetermined cassette is introduced therein to allow for opening of the lid, so that the operational safety of the cassette loading operation is improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cassette loading mechanism for a magnetic recording and/or reproducing device adapted for selectively loading a plurality of kinds of different size cassettes at a recording and/or reproducing position, each said cassette enclosing a magnetic tape as the magnetic recording medium, comprising:

a casing provided with an inserting opening for a large size cassette and an inserting opening for a small size cassette each contoured to conform to the large size cassette and the small size cassette to be introduced;

large size cassette holding means for holding at a predetermined position the large size cassette introduced via said large size cassette inserting opening into said casing;

large size cassette shifting means for shifting said large size cassette holding means between a position of inserting said large size cassette and a position for recording and/or reproduction;

small size cassette holding means for holding at a predetermined position the small size cassette inserted into said casing via said inserting opening for said small size cassette;

small size cassette shifting means for shifting said small size cassette holding means between a position of inserting said small size cassette and a position for recording and/or reproduction;

said small size cassette holding means being attachable to said large size cassette holding means that has been shifted to the position for recording and/or reproduction;

a lid movable mounted to said casing for opening or closing the inserting opening for said large size cassette;

first engaging means provided to one of mutually confronting edge portions of said lid, said first engaging means being engageable with said lid and movable between a position engaging with said lid and a position out of engagement with said lid;

second engaging means provided to the other of said mutually confronting edge portions of said lid and operated separately for said first engaging means, said second engaging means being engageable with said lid and movable between a position engaging with said lid and a position out of engagement with said lid;

first urging means for urging said first engaging means and holding said first engaging means at said position engaging with said lid; and second urging means for urging said second engaging means at said position of engaging with said lid;

said first engaging means including a first abutment portion abutting against said cassette introduced via said inserting opening for the large size cassette to shift said first engaging means to said position out of engagement with the lid responsive to the inserting operation of said cassette;

said second engaging means including a second abutment portion abutting against the cassette introduced via said inserting opening for the large size cassette to shift said second engaging means to said portion out of engagement with the lid responsive to the inserting operation of said cassette;

both of said first and second abutment portions abutting against said large size cassette introduced via said inserting opening for the large size cassette, one of said first and second abutment portions being able to abut against said small size cassette inserted via the inserting opening for a large size cassette.

2. The cassette loading mechanism according to claim 1, further comprising opening and closing sensing means provided at the inserting opening for the large size cassette and adapted for sensing the opening or closing of said lid.

* * * * *